(12) United States Patent
McCarty et al.

(10) Patent No.: US 11,736,298 B2
(45) Date of Patent: *Aug. 22, 2023

(54) AUTHENTICATION USING KEY DISTRIBUTION THROUGH SEGMENTED QUANTUM COMPUTING ENVIRONMENTS

(71) Applicant: Accenture Global Solutions Limited, Dublin (IE)

(72) Inventors: Benjamin Glen McCarty, Washington, DC (US); Ellie Marie Daw, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 103 days.

This patent is subject to a terminal disclaimer.

(21) Appl. No.: 17/403,008

(22) Filed: Aug. 16, 2021

(65) Prior Publication Data

US 2021/0377034 A1    Dec. 2, 2021

Related U.S. Application Data

(63) Continuation of application No. 16/599,586, filed on Oct. 11, 2019, now Pat. No. 11,121,878.

(51) Int. Cl.
*H04L 9/32* (2006.01)
*G06N 10/00* (2022.01)
(Continued)

(52) U.S. Cl.
CPC .......... *H04L 9/3234* (2013.01); *G06N 10/00* (2019.01); *H04L 9/0852* (2013.01);
(Continued)

(58) Field of Classification Search
CPC ... H04L 63/062; H04L 63/08; H04L 63/0428; H04L 63/0807; G06N 10/10
(Continued)

(56) References Cited

U.S. PATENT DOCUMENTS 7,028,275 B1    4/2006    Chen et al.
7,035,411 B2    4/2006    Azuma et al.
(Continued)

OTHER PUBLICATIONS

Secured cloud authentication using quantum cryptography, Murali et al, Aug. 2017 (Year: 2017).*
(Continued)

*Primary Examiner* — Jahangir Kabir
(74) *Attorney, Agent, or Firm* — Fish & Richardson P.C.

(57) ABSTRACT

Methods, systems, and apparatus for authenticating and authorizing users using quantum key distribution through segmented quantum computing environments. In one aspect, a method includes receiving a first and second plaintext data input from a first party and from a second party, respectively; applying a quantum computation translation operation to the first and second plaintext data inputs to generate a corresponding first sequence of quantum computations and a second sequence of quantum computations; implementing the first and second sequence of quantum computations in a first and second segmented quantum computing environment, respectively, to obtain a first and second sequence of measurement results; generating a first and second encryption key using the first and second sequence of measurement results, respectively, and an encrypted authorization token using the second encryption key; and sending the first encryption key to the first party, and the encrypted authorization token to the second party.

20 Claims, 9 Drawing Sheets

(51) Int. Cl.
  *H04L 29/06* (2006.01)
  *H04L 9/08* (2006.01)
  *H04L 9/40* (2022.01)
(52) U.S. Cl.
  CPC .......... *H04L 9/0891* (2013.01); *H04L 9/3271* (2013.01); *H04L 63/083* (2013.01); *H04L 63/0853* (2013.01); *H04L 63/18* (2013.01)
(58) Field of Classification Search
  USPC ................................................. 713/159, 172
  See application file for complete search history.

(56) References Cited

U.S. PATENT DOCUMENTS

| | | | |
|---|---|---|---|
| 8,631,367 B2 | 1/2014 | Pesetski et al. | |
| 8,744,075 B2* | 6/2014 | Tanaka ................. | H04L 9/0858 380/278 |
| 10,574,446 B2* | 2/2020 | Fu ......................... | H04L 9/0852 |
| 11,121,878 B2 | 9/2021 | McCarty et al. | |
| 11,206,131 B1* | 12/2021 | Griffin ................. | H04L 9/0869 |
| 11,245,519 B1* | 2/2022 | Stapleton, Jr. ........ | H04L 9/0858 |
| 2017/0222803 A1* | 8/2017 | Tanizawa ............ | H04L 63/0853 |
| 2020/0272928 A1 | 8/2020 | Van den berg | |
| 2021/0058244 A1 | 2/2021 | Jacak et al. | |
| 2021/0109707 A1 | 4/2021 | McCarty et al. | |
| 2021/0111898 A1 | 4/2021 | McCarty et al. | |

OTHER PUBLICATIONS

[No Author Listed], "Activity Guide—Encoding Hexadecimal Numbers", retrieved from URL: https://www.mrshasseld.com/uploads/2/6/1/1/26119949/u214activityguide_key-hexadecimalnumbers.pdf, retrieved on Dec. 11, 2019, 4 pages.
A quantum encryption design featuring confusion, diffusion, and mode of operation, Hu et al., Oct. 2020 (Year: 2020).
Barnum et al., "Authentication of Quantum Message" arXiv:quant-ph/0205128, dated May 20, 2002, 23 pages.
Crockett et al., "Prototyping post-quantum and hybrid key exchange and authentication in TLS and SSH", retrieved from URL: https://csrc.nist.gov/CSRC/media/Events/Second-PQC-Standardization-Conference/documents/accepted-papers/stebila-prototyping-post-quantum.pdf, dated Jul. 19, 2019, 24 pages.
Kiktenko et al., "Lightweight authentication for quantum key distribution", arXiv:1903.10237v1, dated Mar. 25, 2019, 10 pages.
Ozols, "Clifford Group", retrieved from URL: http://home.lu.lv/~sd20008/papers/essays/Clifford%20group%20%5bpaper%5d.pdf, dated Jul. 31, 2008, 4 pages.
Soni et al., "Multi-factor Authentication Security Framework in Cloud Computing", International Journal of Advanced Research in Computer Science and Software Engineering, 5(1):1065-1071, dated Jan. 1, 2015.

* cited by examiner

FIG. 5

Quantum computation translation operation of FIG. 4

T=Alice and Bob's entangled qubits will match 100% of the time

F=Alice and Bob's entangled qubits will match 0% of the time

%=Alice and Bob's entangled qubits will match 50% of the time

!=Unintended match of Alice and Bob's entangled qubits

AUTHENTICATION USING KEY DISTRIBUTION THROUGH SEGMENTED QUANTUM COMPUTING ENVIRONMENTS

CROSS REFERENCE TO RELATED APPLICATION

This application is a continuation of U.S. patent application Ser. No. 16/599,586, filed Oct. 11, 2019, now allowed, which is incorporated by reference in its entirety.

BACKGROUND

Authentication techniques are used for many purposes, including granting access to client devices, confidential data, computer networks, and other secure systems. There are various authentication techniques that can be used to verify the identity of a person attempting to gain access to a system. One common authentication technique is the use of passwords. However, passwords are easily stolen. Another authentication technique is multi-factor authentication in which two or more authentication factors—knowledge factors such as a password, possession factors such as a hardware or software token, or inherence factors such as a biometric identifier or signature—are verified prior to granting access. This technique can be more secure than using a password alone. However, even multi-factor authentication techniques that use strong encryption may not be secure against quantum computing attacks.

SUMMARY

This specification describes systems, methods, devices and other techniques for authenticating and authorizing users using quantum key distribution through segmented quantum computing environments.

In general, one innovative aspect of the subject matter described in this specification can be implemented in a method that includes receiving i) a first plaintext data input from a first party, and ii) a second plaintext data input from a second party; applying a quantum computation translation operation to i) the first plaintext data input to generate a corresponding first sequence of quantum computations, and ii) the second plaintext data input to generate a corresponding second sequence of quantum computations; implementing i) the first sequence of quantum computations in a first segmented quantum computing environment to obtain a first sequence of measurement results, and ii) the second sequence of quantum computations in a second segmented quantum computing environment to obtain a second sequence of measurement results; generating i) a first encryption key using the first sequence of measurement results, ii) a second encryption key using the second sequence of measurement results, and iii) an encrypted authorization token using the second encryption key; and sending i) the first encryption key to the first party, and ii) the encrypted authorization token to the second party.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations applying a quantum computation translation operation to i) the first plaintext data input to generate a corresponding first sequence of quantum computations, and ii) the second plaintext data input to generate a corresponding second sequence of quantum computations comprises independently: applying the quantum computation translation operation to the first plaintext data input using a first classical processor in the first segmented quantum computing environment; and applying the quantum computation translation operation to the second plaintext data input using a second classical processor in the second segmented quantum computing environment.

In some implementations implementing i) the first sequence of quantum computations in a first segmented quantum computing environment to obtain a first sequence of measurement results comprises, for each quantum computation in the first sequence of quantum computations: implementing the quantum computation on a first qubit included in the first segmented quantum computing environment; measuring the first qubit in the first segmented quantum computing environment; and providing a measurement result to classical hardware included in the first segmented quantum computing environment.

In some implementations the classical hardware is subjected to one or more of Network-Function-Virtualization or Software-Defined-Networking.

In some implementations implementing i) the second sequence of quantum computations in a second segmented quantum computing environment to obtain a second sequence of measurement results comprises, for each quantum computation in the second sequence of quantum computations: implementing the quantum computation on a second qubit included in the second segmented quantum computing environment; measuring the second qubit in the second segmented quantum computing environment; and providing a measurement result to classical hardware included in the second segmented quantum computing environment.

In some implementations the classical hardware is subjected to one or more of Network-Function-Virtualization or Software-Defined-Networking.

In some implementations the first segmented quantum computing environment comprises a first ephemeral segmented quantum computing environment and the second segmented quantum computing environment comprises a second ephemeral segmented quantum computing environment.

In some implementations the method further comprises: receiving, from a second party, an indication that a first party has requested access to data stored by the second party; and creating the first ephemeral segmented quantum computing environment and the second ephemeral segmented quantum computing environment.

In some implementations the first plaintext data input comprises a first response to an authentication challenge and the second plaintext data input comprises a second response to the authentication challenge.

In some implementations the authentication challenge comprises an authentication challenge sent to the first party from the second party in response to the second party receiving a request from the first party to access to data stored by the second party, the authentication challenge comprising an authentication challenge previously established between the first party and the second party during an enrollment process.

In some implementations the second response to the authentication challenge comprises an expected response to the authentication challenge.

In some implementations the first plaintext data input is received via an Out-of-Band authenticator device.

In some implementations the method further comprises sending, to the second party, an indication that the first plaintext data input has been received from the first party.

In some implementations the method further comprises destroying the first encryption key after sending the first encryption key to the first party; and destroying the first segmented quantum computing environment after destroying the first encryption key.

In some implementations the method further comprises destroying the second encryption key after generating the encrypted authorization token; and destroying the second segmented quantum computing environment after sending the encrypted authorization token to the second party.

In some implementations in response to receiving the first encryption key, the first party provides the first encryption key to the second party; and the second party authorizes access to data requested by the first party when the first encryption key decrypts the encrypted authorization token.

In some implementations the first segmented quantum computing environment comprises a first qubit and the second segmented quantum computing environment comprises a second qubit.

In some implementations implementing i) the first sequence of quantum computations in a first segmented quantum computing environment to obtain a first sequence of measurement results, and ii) the second sequence of quantum computations in a second segmented quantum computing environment to obtain a second sequence of measurement results comprises, for an n-th quantum computation in the first sequence of quantum computations and in the second sequence of quantum computations: initializing the first qubit and the second qubit in a zero state; initializing a third qubit and a fourth qubit in a zero state; entangling the third qubit and the fourth qubit; applying a first swap quantum gate to the first qubit and the third qubit; applying a second swap quantum gate to the second qubit and the fourth qubit; applying the n-th quantum computation in the first sequence of quantum computations on the first qubit and measuring the first qubit to obtain a respective n-th measurement result in the first sequence of measurement results; and applying the n-th quantum computation in the second sequence of quantum computations on the second qubit and measuring the second qubit to obtain a respective n-th measurement result in the second sequence of measurement results.

In some implementations entangling the third qubit and the fourth qubit comprises applying a Hadamard gate to the third qubit and a CNOT operation to the third qubit and the fourth qubit, wherein the third qubit acts as a control for the CNOT operation.

In some implementations the quantum computation translation operation comprises an operation that maps each character in a plaintext data input to a respective quantum computation.

In some implementations the first plaintext data input and the second plaintext data input comprise hexadecimal data inputs.

In some implementations the quantum computation translation operation maps each hexadecimal character in a data input to a respective quantum computation in a set of multiple quantum computations.

In some implementations the set of multiple quantum computations comprises quantum computations comprising at most three single-qubit quantum gates.

In some implementations the set of multiple quantum computations comprises five quantum computations comprising one respective single-qubit quantum gate.

In some implementations the set of multiple quantum computations comprises seven quantum computations comprising two respective single-qubit quantum gates.

In some implementations the set of multiple quantum computations comprises four quantum computations comprising three respective single-qubit quantum gates.

In some implementations each quantum computation in the set of multiple quantum computations comprises one or more single-qubit quantum gates from the Clifford group.

In some implementations each quantum computation in the set of multiple quantum computations comprises one or more single-qubit quantum gates from a set of single-qubit quantum gates, the set of single qubit gates comprising identity operations, Pauli-X gates, Pauli-Y gates, Pauli-Z gates, Hadamard gates, S gates and complex conjugates of the S gate.

In some implementations the quantum computation translation operation maps: a first hexadecimal character to a single qubit identity operation; a second hexadecimal character to a Pauli-X gate, wherein the second hexadecimal character is different to the first hexadecimal character; a third hexadecimal character to a Hadamard gate, wherein the third hexadecimal character is different to the first and second hexadecimal character; a fourth hexadecimal character to a Hadamard gate and a Pauli-X gate, wherein the fourth hexadecimal character is different to the first to third hexadecimal character; a fifth hexadecimal character to a Hadamard gate and a S gate, wherein the fifth hexadecimal character is different to the first to fourth hexadecimal character; a sixth hexadecimal character to a Hadamard gate and a complex conjugate of an S gate, wherein the sixth hexadecimal character is different to the first to fifth hexadecimal character; a seventh hexadecimal character to a Pauli-Y gate and a Hadamard gate, wherein the seventh hexadecimal character is different to the first to sixth hexadecimal character; a eighth hexadecimal character to a Pauli-X gate and a Hadamard gate, wherein the eighth hexadecimal character is different to the first to seventh hexadecimal character; a ninth hexadecimal character to a Pauli-Z gate and a Hadamard gate, wherein the ninth hexadecimal character is different to the first to eighth hexadecimal character; a tenth hexadecimal character to a S gate and a Hadamard gate, wherein the tenth hexadecimal character is different to the first to ninth hexadecimal character; a eleventh hexadecimal character to a S gate, wherein the eleventh hexadecimal character is different to the first to tenth hexadecimal character; a twelfth hexadecimal character to a complex conjugate of an S gate, wherein the twelfth hexadecimal character is different to the first to eleventh hexadecimal character; a thirteenth hexadecimal character to a Pauli-X gate, an S gate, and a Hadamard gate, wherein the thirteenth hexadecimal character is different to the first to twelfth hexadecimal character; a fourteenth hexadecimal character to a Pauli-Y gate, an S gate, and a Hadamard gate, wherein the fourteenth hexadecimal character is different to the first to thirteenth hexadecimal character; a fifteenth hexadecimal character to a Pauli-Z gate, an S gate, and a Hadamard gate, wherein the fifteenth hexadecimal character is different to the first to fourteenth hexadecimal character; and a sixteenth hexadecimal character to a S gate, a Hadamard gate, and a Pauli-X gate wherein the sixteenth hexadecimal character is different to the first to fifteenth hexadecimal character.

In general, another innovative aspect of the subject matter described in this specification can be implemented in a method that includes sending, from a first party accessor and to a second party access target, a request to access the second party access target; receiving, from the second party access target and at the first party accessor, an authentication challenge, wherein the authentication challenge comprises an authentication challenge previously established between the first party accessor and the second party access target during an enrollment process; generating, by the first party accessor, a response to the received authentication challenge, wherein the response comprises a first plaintext data input; sending, from the first party accessor, the first plaintext data input to a third party quantum computing environment, wherein the third party quantum computing environment: applies a quantum computation translation operation to i) the first plaintext data input to generate a corresponding first sequence of quantum computations, and ii) a second plaintext data input received from the second party access target to generate a corresponding second sequence of quantum computations; implements i) the first sequence of quantum computations in a first segmented quantum computing environment to obtain a first sequence of measurement results, and ii) the second sequence of quantum computations in a second segmented quantum computing environment to obtain a second sequence of measurement results; and generates i) a first encryption key using the first sequence of measurement results, ii) a second encryption key using the second sequence of measurement results, and iii) an encrypted authorization token using the second encryption key; receiving, by the first party accessor and from the third party quantum computing environment, the first encryption key; providing the first encryption key to the second party access target; and in response to the second party access target authorizing the request using the encrypted authorization token and the first encryption key, obtaining access to the second party access target; or in response to the second party denying the request using the encrypted authorization token and the first encryption key, receiving data indicating denial of access to the second party access target.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

In general, another innovative aspect of the subject matter described in this specification can be implemented in a method that includes receiving, by a second party access target and from a first party accessor, a request for access to the second party access target; sending, from the second party access target and to the first party accessor, an authentication challenge, wherein the authentication challenge comprises an authentication challenge previously established between the first party accessor and the second party access target during an enrollment process; sending, from the second party access target and to a third party quantum computing system, a response to the authentication challenge, wherein the response comprises a second plaintext data input and wherein the third party quantum computing environment: applies a quantum computation translation operation to i) a first plaintext data input received from the first party accessor to generate a corresponding first sequence of quantum computations, and ii) the second plaintext data input to generate a corresponding second sequence of quantum computations; implements i) the first sequence of quantum computations in a first segmented quantum computing environment to obtain a first sequence of measurement results, and ii) the second sequence of quantum computations in a second segmented quantum computing environment to obtain a second sequence of measurement results; and generates i) a first encryption key using the first sequence of measurement results, ii) a second encryption key using the second sequence of measurement results, and iii) an encrypted authorization token using the second encryption key; receiving, by the second party access target and from the third party, the encrypted authorization token; receiving, from the first party accessor, the first encryption key; decrypting the first encryption key using the encrypted authorization token; determining whether decryption of the first encryption key is successful or unsuccessful; in response to determining that the decryption is successful, allowing the first party accessor access; and in response to determining that the decryption is unsuccessful, denying the first party access.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular ways so as to realize one or more of the following advantages.

The presently described authentication and authorization techniques provide secure authentication and authorization in post-quantum era where other conventional techniques, e.g., password-less multifactor authentication techniques that use strong encryption, may no longer be secure. In particular, the presently described techniques can be more effective at preventing quantum or classical attacks, e.g., attacks against asymmetric cryptography, from malicious parties since a same key is generated in independent computing environments without communicating or sharing the key between the independent computing environments. Furthermore, the advantages of quantum security can be achieved without requiring qubit transmission or a functional, scalable quantum internet.

Performing the classical and quantum computations required to generate authentication keys and tokens within segmented computing environments provides additional layers of security that can increase protection against threat actors seeking to manipulate or eavesdrop on the authentication process. For example, smaller and independent computing environments may be easier to isolate, e.g., against threat actors and to prevent unwanted information exchanges between the computing environments. In addition, smaller and independent computing environments may be easier to monitor and protect. As another example, segmenting the computing environment can require that hackers compromise multiple computing environments instead of one. As another example, segmented (or virtualized) computing environments can be generated in randomized (logically and physically) locations which mitigates eavesdroppers. As another example, virtualized computing environments can be designed to have reduced attack surfaces and attack vectors by only enabling functionality/components needed for the specialized task(s) expected of the virtual computing environment to generate a quantum key and nothing more.

In addition, the presently described techniques are consistent with current cloud architecture, since current software-as-a-service architectures run within shared hardware a lot of the time. The techniques allow for hardware to be shared. Therefore quantum operations can leverage qubits within close proximity (as is typical for quantum computing hardware setups) but the software environments can be segmented. Additionally, when they are separate, the segments of memory cannot be accessed by the other party. Further, they can be ephemeral so no collateral key material will be stored longer than the system needs the collateral key material.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows an example truth table of measurement results for implementations of an example quantum computation translation.

Like reference numbers and designations in the various drawings indicate like elements.

DETAILED DESCRIPTION

This specification describes methods and systems for authenticating a first party accessor and authorizing the first party accessor access to a second party access target using quantum key distribution through segmented quantum computing environments, e.g., ephemeral segmented quantum clouds.

Figure 1:
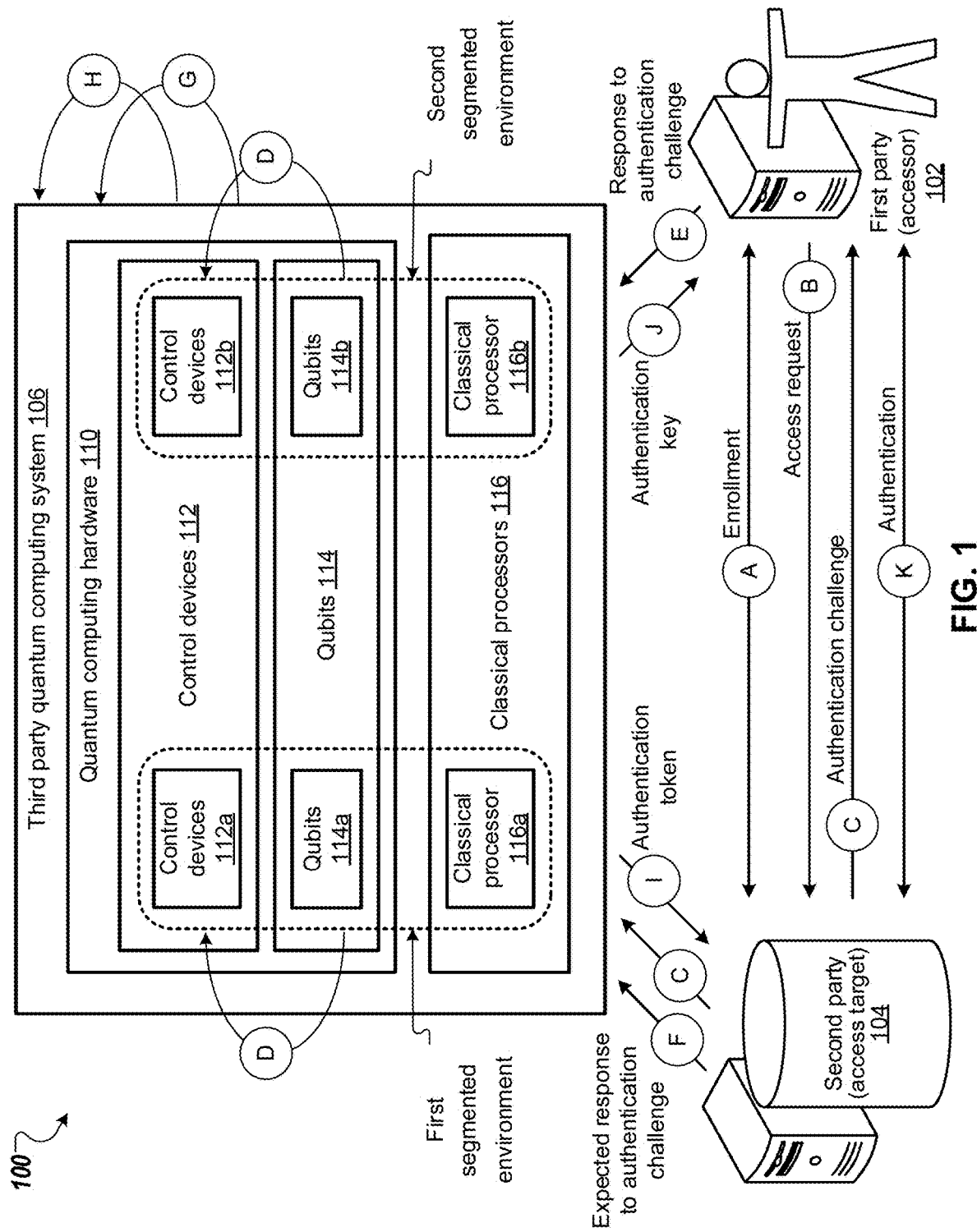
FIG. 1 shows a conceptual block diagram of an example system performing an authentication and authorization process using quantum key distribution through segmented quantum computing environments.

FIG. 1 shows a conceptual block diagram of an example system 100 performing an authentication and authorization process using quantum key distribution through segmented quantum computing environments. Briefly, the system 100 includes a first party accessor 102, a second party access target 104, and a third party quantum computing system 106. The components of the system 100 can exchange electronic communications over one or more networks, or can exchange communications in another way, such as over one or more wired or wireless connections. Generally, quantum computing components of the system 100 can be implemented as quantum computers having physical hardware like that described with respect to FIG. 2 and classical computing components of the system 100 can be implemented as one or more classical computers having physical hardware like that described with respect to FIG. 10.

During stage (A) of the quantum key distribution process, the first party accessor 102 and second party access target 104 register, record and provision one or more authentication protocols in an enrollment stage.

For example, the first party accessor 102 and second party access target 104 can register, record and provision a challenge-response based authentication protocol. In these examples, during enrollment the first party accessor 102 and second party access target 104 can establish multiple challenge questions and corresponding responses. Then, after enrollment, when the first party accessor 102 requests access to the second party access target 104, the second party access target 104 can send the first party accessor 102 a randomly selected challenge from the pre-established multiple challenge questions. The first party accessor 102 can generate a response to the received challenge, e.g., by applying a cryptographic hash function to the received challenge combined with a user password. The second party access target 104 can also apply the same hash function to the known response that corresponds to the randomly selected challenge, combined with its own copy of the user password. In a standard challenge-response approach, if the hash function outputs match, there is a high probability that the first party accessor 102 has submitted the correct password and the second party access target 104 can determine to allow the first party accessor 102 access.

For convenience, the authentication and authorization techniques described in this specification implement challenge-response authentication protocols, however other authentication protocols may also be used, e.g., password based authentication protocols.

During stage (B) of the quantum key distribution process, the first party accessor 102 transmits a request to the second party access target 104 for access to the second party access target 104.

During stage (C) of the quantum key distribution process, the second party access target 104 selects an authentication challenge for the first party accessor 102 using information generated during stage (A), and transmits data representing the authentication challenge to the first party accessor 102.

The second party access target 104 can further transmit data indicating that the first party accessor 102 has requested authentication and access to the second party access target 104 to the third party quantum computing system 106.

In some implementations, during stage (D) of the quantum key distribution process, the third party quantum computing system 106 creates a first and second ephemeral segmented quantum computing environment for ingestion and manipulation of data (e.g., responses to the authentication challenge) received from the first party accessor 102 and the second party access target 104, respectively. In other implementations the third party quantum computing system 106 may already include the first and second segmented quantum computing environment.

During stage (E) of the quantum key distribution process, the first party accessor 102 generates a response to the authentication challenge received during stage (C), and transmits the generated response to the third party quantum computing system 106. In some implementations the first party accessor 102 can use an Out-of-Band authenticator device, e.g., any device that utilizes a communications channel separate from the primary communication channels, to securely transmit the generated response to the third party quantum computing system 106.

During stage (F) of the quantum key distribution process, the second party access target 104 selects or identifies an expected response to the authentication challenge using information generating during stage (A), and transmits the response to the third party quantum computing system 106.

Optionally, in response to receiving the response to the authentication challenge from the first party accessor 102 and prior to step (F). the third party quantum computing system 106 can transmit data to the second party access target 104 confirming that the first party accessor 102 generated and provided a response to the authentication challenge. In this way, the second party access target's providing of an expected response occurs after the first party accessor has provided its response and thus the second party access target's provision of an expected response cannot be hacked and used by the first party accessor in providing its response that occurred earlier in time.

During stage (G) of the quantum key distribution process, the third party quantum computing system 106 uses two segmented quantum computing environments (e.g., ephemeral segmented quantum computing environments) to apply a quantum computation translation operation independently to a) the authentication challenge response received from the first party accessor 102 and b) the authentication challenge response received from the second party access target 104. For example, the third party quantum computing system 106 can use a classical processor included in the first segmented quantum computing environment to apply the quantum computation translation operation to the authentication challenge response received from the first party accessor 102 and a classical processor included in the second segmented quantum computing environment to apply the quantum computation translation operation to the authentication challenge response received from the second party access target 104.

The quantum computation translation operation maps the authentication challenge responses to respective sequences of quantum computations. For example, each character in an authentication challenge response can be mapped in sequence to a corresponding quantum computation, e.g., one or more quantum gates. Example quantum computation translation operations are described in more detail below with reference to FIGS. 4-6.

During stage (H) of the quantum key distribution process, the third party quantum computing system 106 performs a first sequence of quantum computations corresponding to the authentication challenge responses received from the first party accessor 102 within one of the two segmented quantum computing environments, and performs a second sequence of quantum computations corresponding to the authentication challenge received from the second party access target 104 within the other segmented quantum computing environment. Performing sequences of quantum computations corresponding to authentication challenge responses within isolated quantum computing environments is described in more detail below with reference to FIGS. 3-6.

The third party quantum computing system 106 uses measured results from the first sequence of quantum computations and second sequence of quantum computations to independently generate a first authentication key and a second authentication key, respectively, in each of the two segmented quantum computing environments. The third party quantum computing system 106 further generates an authorization token encrypted by the second symmetric authentication key.

During stage (I) and (J) of the quantum key distribution process, the third party quantum computing system 106 transmits the generated authentication token to the second party access target 104 and the generated first authentication key to the first party accessor 102.

During stage (K) of the quantum key distribution process, the first party accessor 102 authenticates to the second party access target 104. The first party accessor 102 transmits the first authentication key received from the third party quantum computing system 106 during stage (J) to the second party access target 104. The second party access target 104 uses the first authentication key to decrypt the authorization token received from the third party quantum computing system 106 during stage (I). If the authorization key successfully decrypts the authorization token, the second party access target 104 grants the first party accessor 102 access to a second party access target resource. If the authorization key does not successfully decrypt the authorization token, the first party accessor 102 is denied access to the second party access target 104.

Figure 2:
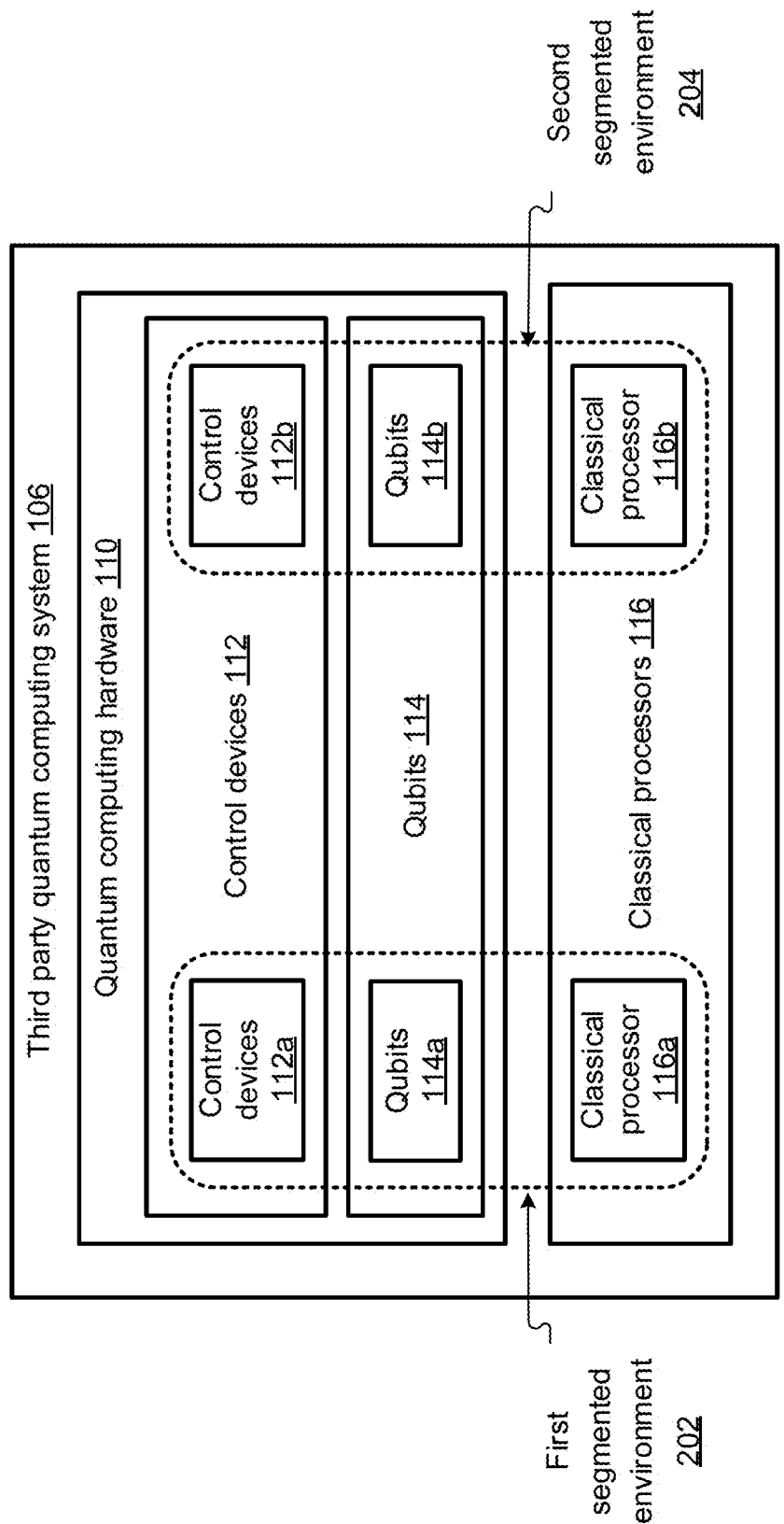
FIG. 2 shows an example an example third party quantum computing system.

FIG. 2 is a block diagram of an example third party quantum computing system 106. The system 106 is an example of a system implemented as computer programs on one or more classical and quantum computing devices in one or more locations, in which the systems, components, and techniques described below can be implemented. In some implementations the third party quantum computing system 106 may be a cloud-based quantum computing service.

The example system 106 includes multiple classical processors 116 for performing classical computations and quantum computing hardware 110 for performing quantum computations. For convenience, the classical processors 116 and quantum computing hardware 110 are illustrated as separate entities. However, in some implementations one or more classical processors can be included in quantum computing hardware 110, e.g., the quantum computing hardware 110 can include one or more components for performing classical computing operations.

The quantum computing hardware 110 includes components for performing quantum computations using quantum circuits. For example, the quantum computing hardware 110 includes multiple qubits 114 that are used to perform algorithmic operations or quantum computations and control devices 112 that operate the multiple qubits 114.

The specific physical realization of the qubits 114 and how they interact with one another is dependent on a variety of factors including the type of quantum computations that the quantum computing hardware 110 is performing. For example, the qubits may be realized via atomic, molecular or solid-state quantum systems. In other examples the qubits may include, but are not limited to, superconducting qubits or semi-conducting qubits.

The qubits 114 can be frequency tunable. For example, each qubit may have associated operating frequencies that can be adjusted, e.g., using one or more of the control devices 112, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates, e.g., Pauli-X, Pauli-Y, Pauli-Z, Hadamard and S gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates, e.g., CNOT gates or swap gates.

The control devices 112 can further include measurement devices, e.g., readout resonators. Measurement results obtained via measurement devices may be provided to one or more of the classical processors 116 for processing and analyzing.

The classical processors 116 include components for performing classical computations. For example, the classical processors 116 can be configured to apply quantum computation translation operations to authentication challenge responses received at the third party quantum computing system 106 from a first party accessor and a second party access target. As another example, the classical processors 116 can also be configured to generate encryption keys and authentication tokens based on received authentication challenge responses and quantum computation measurement results, as described in more detail below with reference to FIG. 7. In addition, the classical processors 116 can be configured to perform overhead classical operations associated with quantum computations.

The third party quantum computing system 106 can include or be configured to create dynamically multiple segmented quantum computing environments, e.g., first segmented quantum computing environment 202 and second segmented quantum computing environment 204. Each segmented quantum computing environment can include or have access to respective quantum computing hardware and classical computing hardware.

For example, first segmented quantum computing environment 202 includes one or more respective qubits, e.g., qubits 114a, and second segmented quantum computing environment 204 includes one or more respective qubits, e.g., qubits 114b. In addition, first segmented quantum computing environment 202 includes one or more respective classical processors, e.g., classical processors 116a, and second segmented quantum computing environment 204 include one or more respective classical processors, e.g., classical processors 116b.

In some cases each segmented quantum computing environment can also include one or more respective control devices that operate on qubits included in the segmented quantum computing environment. For example, first segmented quantum computing environment 202 can include one or more control devices 112a that operate on qubits 114a, and second segmented quantum computing environment 204 can include one or more control devices 112b that operate on qubits 114b. In other cases the qubits 114a, 114b can be controlled using control devices in a shared space, i.e., outside of the first segmented quantum computing environment 202 and second segmented quantum computing environment 204.

The segmentation of the third party quantum computing system 106 into multiple segmented quantum computing environments and a shared space that includes additional qubits, control devices and classical processors can be achieved in one or more of the following ways.

Qubits included in each segmented quantum computing environment, e.g., qubits 114a and 114b, are part of the quantum computing hardware 110 and therefore may be positioned relatively close to each other and to other qubits included in the quantum computing hardware 110, e.g., centimeters away from each other. However, qubits included in respective segmented quantum computing environments, e.g., qubits 114a and 114b, are inherently segmented both logically and physically.

Alternatively or in addition, in some implementations the quantum computation translation operation applied to authentication challenge responses received from a first party accessor and a second party access target can be applied independently within respective segmented quantum computation environments. For example, classical processor 116a included in first segmented quantum computing environment 202 can be configured to apply the quantum computation translation operation to a first authentication challenge response received from a first party accessor, and classical processor 116b included in second segmented quantum computing environment 204 can be configured to apply the quantum computation translation operation to a second authentication challenge response received from a second party access target.

Alternatively or in addition, in some implementations measurement results obtained after quantum computations are performed on qubits included in a segmented quantum computing environment can be provided to a classical processor included in the segmented quantum computing environment and processed within the segmented quantum computing environment. For example, classical processor 116a included in first segmented quantum computing environment 202 can be configured to receive and process measurement results corresponding to measurement operations performed on qubits 114a, and classical processor 116b included in second segmented quantum computing environment 204 can be configured to receive and process measurement results corresponding to measurement operations performed on qubits 114b.

Alternatively or in addition, hardware used to measure qubits in a segmented quantum computing environment can undergo Network-Function-Virtualization and/or Software-Defined-Networking. Virtualized networking can allow for a randomized cloud space to be established for the purpose of the measuring qubits in ephemeral segmented quantum computing environments (which are later destroyed.) Such cloud randomization can prevent an Evil Eavesdropper from bypassing anti-eavesdropper features of the quantum—and just wait to eavesdrop once the quantum information is converted into classical information.

Figure 3:
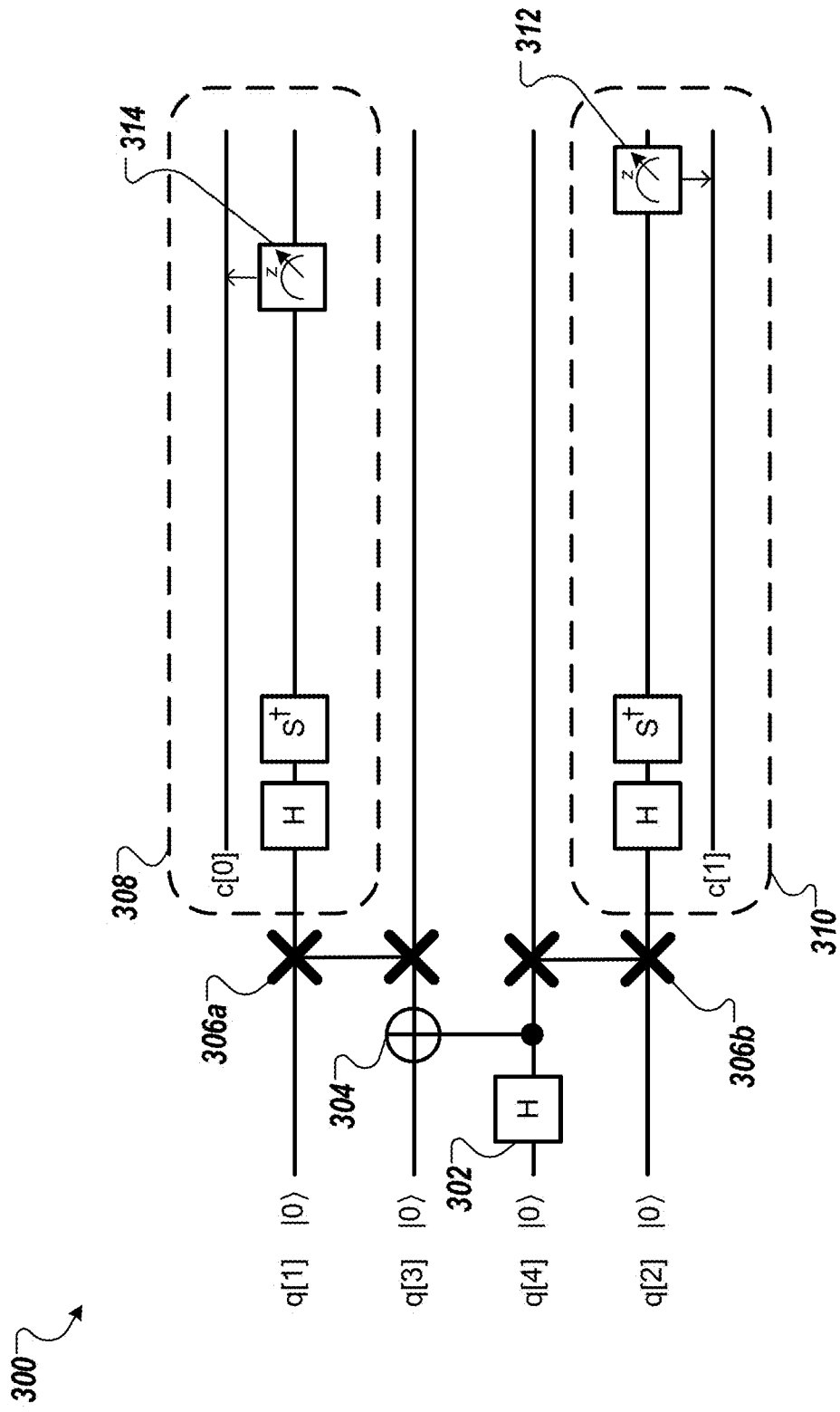
FIG. 3 shows an example quantum circuit for implementing a first quantum computation in a first segmented quantum computing environment and a second quantum computation in a second segmented quantum computing environment.

FIG. 3 shows an example quantum circuit 300 for implementing a first quantum computation in a first segmented quantum computing environment and a second quantum computation in a second segmented quantum computing environment. For example, the example quantum circuit 300 or variations thereof could be repeatedly used to implement the sequence of quantum computations described below with reference to step 606 of FIG. 6.

The example quantum circuit 300 operates on a register of four qubits q[1]-q[4], where each of the four qubits are prepared in a zero state |0>. The four qubits can be positioned on a single piece of quantum hardware, e.g., in quantum computing hardware 110 of FIG. 2, and can be controlled using control devices included in the quantum computing hardware.

First, an initialization process is performed. The third qubit q[3] and fourth qubit q[4] are entangled to create a bell-state pair. In particular, a Hadamard gate 302 is applied to the fourth qubit q[4] and a CNOT operation 304 is applied to the third and fourth qubits q[3] and q[4], with the fourth qubit q[4] acting as the control. The quantum gates 302 and 304 create the bell-state pair.

The entangled states of the third qubit q[3] and the fourth qubit q[4] are then swapped to the first qubit q[1] and the second qubit q[2], respectively. In particular, a swap gate 306a is applied to the first qubit q[1] and to the third qubit q[3] to swap the states of the first qubit q[1] and third qubit q[3], and a swap gate 306b is applied to the second qubit q[2] and to the fourth qubit q[4] to swap the states of the second qubit q[2] and fourth qubit q[4]. Gates 302, 304, 306a and 206b are part of an initialization of the qubits prior to application of the quantum gates that are a result of the first party accessor's response and the second party access target's expected response, respectively.

The first quantum computation is performed on the first qubit q[1] in the first segmented quantum computing environment 308. In example quantum circuit 300 the first quantum computation includes application of a Hadamard gate followed by the complex conjugate of an S gate. For example, under the example quantum computation translation operation described below with reference to FIG. 4, the first quantum computation may correspond to the hexadecimal character "5". After the first quantum computation has been performed on the first qubit q[1], a measurement operation 314 is applied and the outcome of the measurement operation 314 is transferred to classical hardware in the first segmented quantum computing environment, e.g., via classical bit c[0].

The second quantum computation is performed on the first qubit q[2] in the second segmented quantum computing environment 310. In example quantum circuit 300 the second quantum computation also includes application of a Hadamard gate followed by the complex conjugate of an S gate. This indicates that the elements in the authentication challenge responses provided by the first party accessor and the second party access target that map to the first quantum computation and the second quantum computation are the same. If they had not been the same, different quantum gates might be applied (e.g., unless the process was stopped for example because the system determined that the length of the accessor's response was different than the expected response provided by the access target). After the second quantum computation has been performed on the second qubit q[2], a measurement operation 312 is applied and the outcome of the measurement operation 312 is transferred to classical hardware in the second segmented quantum computing environment, e.g., via classical bit c[1].

Figure 4:
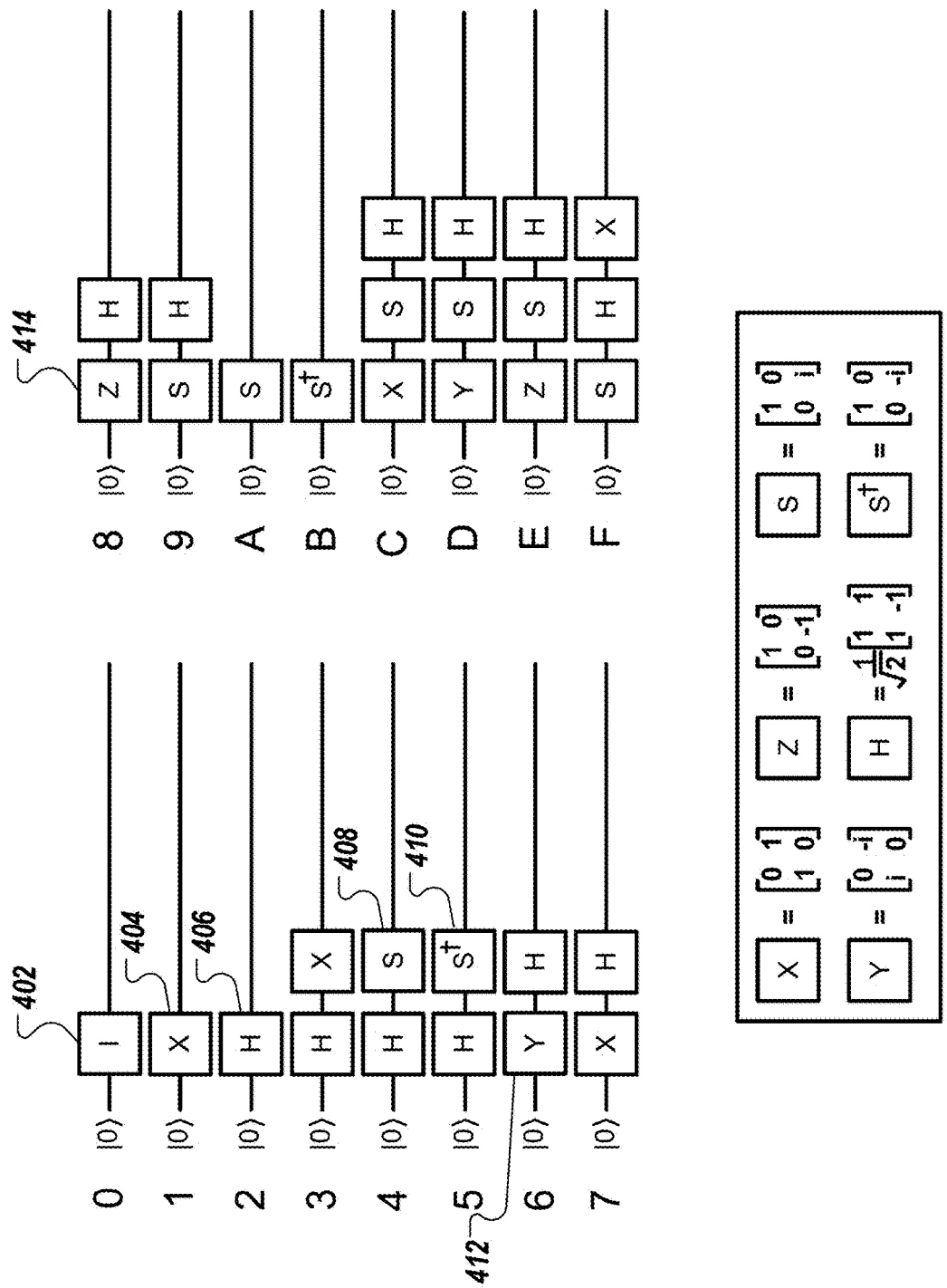
FIG. 4 illustrates an example quantum computation translation operation that maps hexadecimal characters to respective quantum computations.

FIG. 4 illustrates an example quantum computation translation operation that maps hexadecimal characters to respective quantum computations.

The example quantum computation translation operation illustrated in FIG. 4 maps hexadecimal characters 0-9 and A-F to respective sequences of single qubit quantum gates that can be applied to a qubit prepared in an initial state, e.g., a zero state.

For example, the hexadecimal character 0 is mapped to a single qubit identity operation 402. The hexadecimal character 1 is mapped to a Pauli-X gate 404. The hexadecimal character 2 is mapped to a Hadamard gate 406. The hexadecimal character 3 is mapped to a sequence of two single qubit gates—a Hadamard gate followed by a Pauli-X gate The hexadecimal character 4 is mapped to a sequence of two single qubit gates—a Hadamard gate followed by a S gate. The hexadecimal character 5 is mapped to a sequence of two single qubit gates—a Hadamard gate followed by a complex conjugate of an S gate. The hexadecimal character 6 is mapped to a sequence of two single qubit gates—a Pauli-Y gate followed by a Hadamard gate. The hexadecimal character 7 is mapped to a sequence of two single qubit gates—a Pauli-X gate followed by a Hadamard gate. The hexadecimal character 8 is mapped to a sequence of two single qubit gates—a Pauli-Z gate followed by a Hadamard gate. The hexadecimal character 9 is mapped to a sequence of two single qubit gates—an S gate followed by a Hadamard gate.

The hexadecimal character A is mapped to an S gate. The hexadecimal character B is mapped to a complex conjugate of an S gate. The hexadecimal character C is mapped to a sequence of three single qubit gates—a Pauli-X gate, followed by an S gate, followed by a Hadamard gate. The hexadecimal character D is mapped to a sequence of three single qubit gates—a Pauli-Y gate, followed by an S gate, followed by a Hadamard gate. The hexadecimal character E is mapped to a sequence of three single qubit gates—a Pauli-Z gate, followed by an S gate, followed by a Hadamard gate. The hexadecimal character F is mapped to a sequence of three single qubit gates—an S gate, followed by a Hadamard gate, followed by a Pauli-X gate.

The particular mapping of the hexadecimal characters 0-9 and A-F illustrated in FIG. 4 is one of many possible examples. For example, the hexadecimal characters could be mapped to different sequences of single qubit quantum gates, i.e., an arbitrary first hexadecimal character could be mapped to the single qubit identity operation 402, an arbitrary second hexadecimal character could be mapped to the Pauli-X gate 504, etc. In other words, the quantum computation translation operation can be any bijection between the hexadecimal characters 0-9 and A-F and the illustrated sequences of single qubit quantum gates.

The example quantum computation translation operation shown in FIG. 4 provides several technical advantages. For example, the translation operation is particularly useful since many computers store data in a hexadecimal encoding, and cryptographic hashes often use hexadecimal encodings. In addition, since hashes are used in many authentication mechanisms, a system implementing the example (or similar) quantum computation translation operation is able to seamlessly use different authentication protocols, e.g., challenge-response, password-based, etc. Hashes are quantum attack resistant—so using hexadecimal plaintext inputs is advantageous in the post-quantum era for quantum computation. In addition, in one implementation the quantum gate sequences to which the hexadecimal characters are mapped are specifically designed to include 3 gates or less in order to ensure that implementations of the quantum gate sequences are less prone to introducing errors to the qubits on which they operate. Furthermore, the quantum gates used in the quantum gate sequences are universal, elementary, and in the Clifford-group, and therefore are computationally stable, efficient and quantum hardware agnostic.

FIG. 5 shows an example truth table 500 representing an output density matrix of multiple outputs of implementations of the quantum computation translation operation described in FIG. 4.

Each entry in the example truth table 500 corresponds to measured results of first implementations of a respective quantum gate combination on a first qubit in an entangled qubit pair (performed by "Alice" e.g., the accessor) and measured results of second implementations of a respective quantum gate combination on a second qubit in the entangled qubit pair (performed by "Bob" e.g., the access target). For example, entry 502 corresponds to measured results of implementations of a quantum gate sequence SHX (i.e., the sequence of quantum gates to which the quantum computation translation operation maps the hexadecimal character "F" to) on a first qubit, and measured results of implementations of a quantum gate X (i.e., the quantum gate to which the quantum computation translation operation maps the hexadecimal character "1" to) on a second qubit. As another example, entry 504 corresponds to measured results of implementations of a quantum gate S (i.e., the sequence of quantum gates to which the quantum computation translation operation maps the hexadecimal character "A" to) on a first qubit, and measured results of implementations of a quantum gate S on a second qubit.

Each entry of the example truth table 500 can take different values representing a relationship between the measured results of the first implementations of the respective quantum gate combination on the first qubit and the measured results of the second implementations of the respective quantum gate combination on the second qubit.

For example, if the measured results of the first implementations and second implementations are the same, the respective entry in the truth table is a "T" which indicates that the multiple outputs matched 100% of the time. Entries with a "T*" indicate that the multiple outputs matched 100% of the time when the complex conjugate of an S gate was implemented (instead of a standard S gate).

Conversely, if the measured results of the first implementations and second implementations are never the same, the respective entry in the truth table is a "F" which indicates that the multiple outputs matched 0% of the time.

If the measured results of the first implementations and second implementations are the same with probability ½ and differ with probability ½, the respective entry in the truth table is a "%" which indicates that the multiple outputs matched 50% of the time.

Entries in the truth table with "!" represent unintended matches, i.e., cases where the multiple outputs unintentionally matched 100% of the time.

The example truth table 500 is not mutually orthogonal—the table does not show a pattern of "T" values on the diagonals and elsewhere "F" values. This provides an additional layer of security to the authentication process. For example, if the example quantum computation translation operation had been designed to produce an orthogonal truth table, a threat actor with prior knowledge that the data inputs they provide to the third party computing system are incorrect could flip corresponding measurement results in a sequence of measurement results generated by the third party quantum computing system, i.e., flip measured qubit states 0 to a 1 or measured qubit states 1 to a 0. However, the specific construction of the authentication process and quantum computation translation operation described in this specification introduces probabilistic error which prevents such malicious cryptanalysis.

Figure 6:
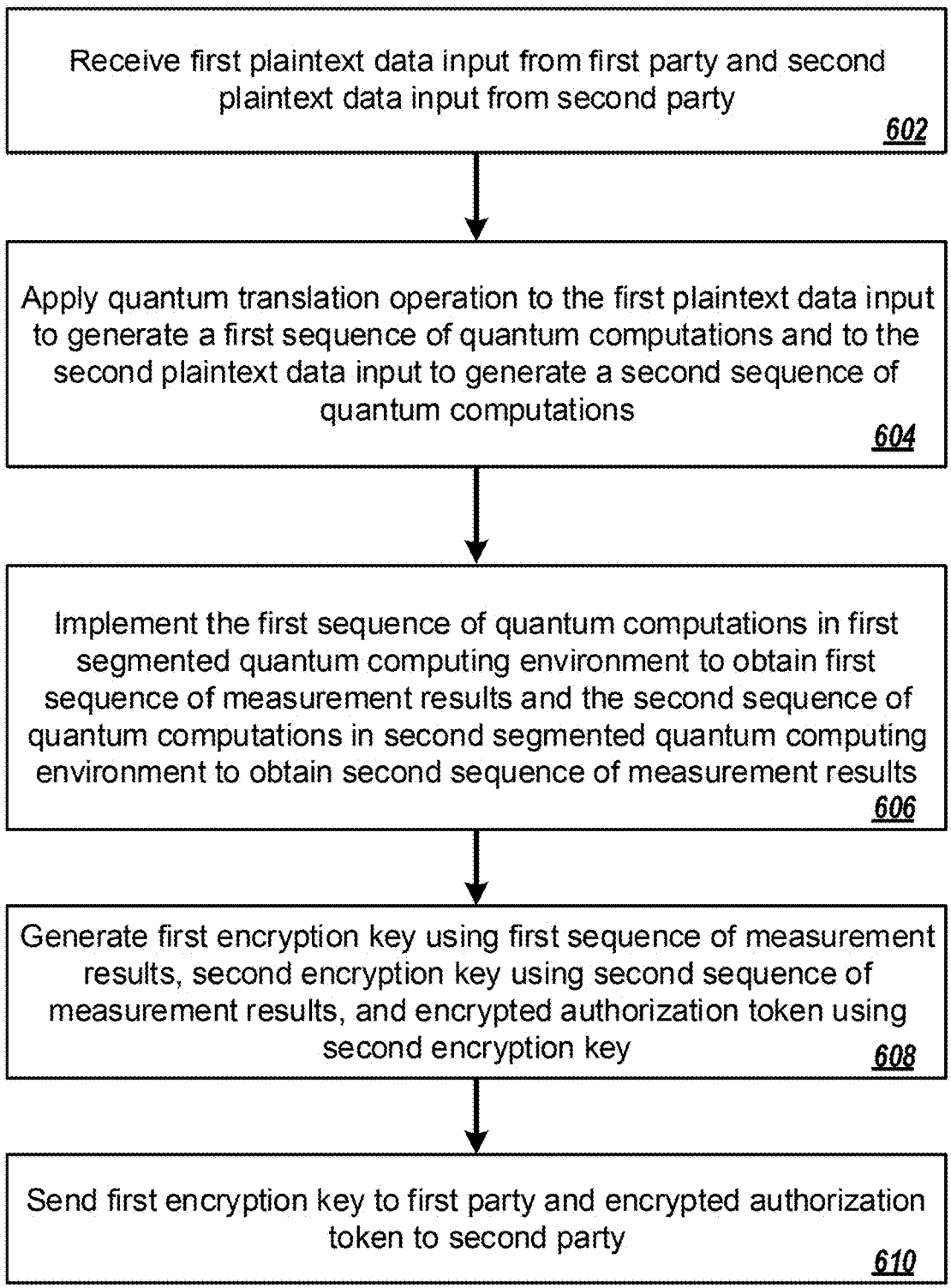
FIG. 6 is a flow diagram of an example process for generating a secure authentication token and secure authentication key.

FIG. 6 is a flowchart of an example process 600 for generating a secure authentication token and secure authentication key. For convenience, the process 600 will be described as being performed by a system of one or more classical and quantum computing devices located in one or more locations. For example, example system 100 of FIG. 1, appropriately programmed in accordance with this specification, can perform the process 600.

The system receives i) a first plaintext data input from a first party, and ii) a second plaintext data input from a second party (step 602). The first plaintext data input and second plaintext data input can include respective sequences of characters from a particular text encoding. For example, the plaintext data inputs may include sequences of hexadecimal characters (0123456789ABCDEF), sequences of binary data, sequences of decimal characters (0123456789), sequences of alphanumeric characters (all letters and numbers, case sensitive), ASCII sequences, sequences in a Unicode transformation format, based 64 encoded sequences, or sequences of raw bytes (e.g., un-coded data such as a byte array). In some implementations, since network traffic can arrive in a uniform formatting, the system can encode/decode between input formats, e.g., binary or hexadecimal, and a selected plaintext format.

In some implementations the first plaintext data input may be a response generated by the first party to an authentication challenge set by the second party. For example, the first party may have requested access to data stored by the second party. In response to the first party requesting access to the data, the second party can send the first party an authentication challenge that was previously established between the first party and the second party during a prior enrollment process. Optionally, the second party can also send the system an indication that the first party has requested access to data stored by the second party, as described below with reference to step 606.

The second plaintext data input may be a response generated by the second party to the authentication challenge, e.g., a response that the second party expects the first party to generate in response to receiving the authentication challenge. In a secure environment, e.g., absent eavesdroppers or malicious parties, and assuming the first party and second party generate error-free responses to the authentication challenge, the first plaintext data input and the second plaintext data input will be the same.

In some implementations the system may send the second party an indication that the first plaintext data input has been received from the first party in response to receiving the first plaintext data input from the first party and before receiving the second plaintext data input from the second party. This indication can trigger the second party to generate and send their plaintext data input to the system and can mitigate attempts made by the first party to mirror, copy or eavesdrop on the second party's plaintext data input.

The system applies a quantum computation translation operation to i) the first plaintext data input to generate a corresponding first sequence of quantum computations, and ii) the second plaintext data input to generate a corresponding second sequence of quantum computations (step 604). The quantum computation translation operation is an operation that maps characters in a plaintext data input to respective quantum computations, where each character in the text encoding used to generate the first plaintext data input and the second plaintext data input maps to a corresponding quantum computation from or generated from a particular set of multiple quantum computations. For example, the quantum computation translation operation can map each hexadecimal character 0-9, A-F appearing in a plaintext data input to a corresponding quantum computation (or sequence of quantum computations) from or generated from a set of multiple quantum computations. As another example, the quantum computation translation operation can map each alphanumeric character (case sensitive letters and numbers) appearing in a plaintext data input to a corresponding quantum computation (or sequence of quantum computations), etc.

In some implementations the set of multiple quantum computations can include multiple quantum gates, e.g., multiple single qubit quantum gates, and the quantum computation translation operation can map characters in a plaintext data input to corresponding sequences of quantum gates in the set of multiple gates. For example, the quantum computation translation operation can map some characters in the plaintext data input to one respective single qubit gate, or can map some characters in the plaintext data input to sequences of quantum gates, e.g., two or more single qubit gates.

As an example, the set of multiple quantum computations can include quantum gates taken from a universal gate set and/or quantum gates in the Clifford group, e.g., Pauli-X gates, Pauli-Y gates, Pauli-Z gates, S gates, Hadamard gates, or complex conjugates thereof. The particular quantum gates included in the set of multiple quantum computations can depend on the text encoding used to generate the first plaintext data input and the second plaintext data, e.g., the size of the alphabet of characters used in the text encoding, performance requirements, and/or properties of the quantum hardware used to implement the quantum computations, e.g., the number of available qubits, qubit error rates, or quantum hardware fidelity. An example quantum computation translation operation is described above with reference to FIG. 5.

The system implements i) the first sequence of quantum computations in a first segmented quantum computing environment to obtain a first sequence of measurement results, and ii) the second sequence of quantum computations in a second segmented quantum computing environment to obtain a second sequence of measurement results (step 606). In some implementations the first segmented quantum computing environment and second segmented quantum computing environment may be ephemeral segmented quantum computing environments, e.g., purposely created to perform step 606 in response to receiving an indication that the first party has requested access to the second party from the second party.

The system can implement the first sequence of quantum computations and the second sequence of quantum computations in parallel and in sequence (with respect to the first plaintext data input and the second plaintext data input.) That is, the system can sequentially for each n=1, . . . , N, implement a quantum computation corresponding to the n-th character in the first plaintext data input in parallel to a quantum computation corresponding to the n-th character in the second plaintext data input to obtain an n-th measurement result in the first sequence of measurement results and an n-th measurement result in the second sequence of measurement results. In some cases, e.g., those where the first plaintext data input is the same as the second plaintext data input, the length of the first plaintext data input and second plaintext data input are equal. In other cases, e.g., those where the first plaintext data input is provided as arbitrary input to the system by a malicious actor pretending to be the first party, the length of the first plaintext data input and second plaintext data input may differ. In these cases the system can implement both sequences of quantum computations in parallel until the shorter sequence is completed, then complete the longer sequence. Since the obtained sequences of measurement results would also differ in length, the system would generate different encryption keys at step 608 described below. Alternatively, the system may abort the process in response to determining that the length of the first plaintext data input and second plaintext data input may differ, e.g., in order not to waste quantum computing resources.

As described above with reference to FIGS. 1-3, the system may include quantum computing hardware comprising multiple qubits. Each of the first segmented quantum computing environment and the second segmented quantum computing environment may include at least one respective qubit. Remaining qubits included in the quantum computing hardware may be shared qubits that can be operated in a shared environment, i.e., outside of either of the first segmented quantum computing environment and the second segmented quantum computing environment.

An example process for implementing a quantum computation corresponding to the n-th character in the first plaintext data input in parallel to a quantum computation corresponding to the n-th character in the second plaintext data input to obtain an n-th measurement result in the first sequence of measurement results and an n-th measurement result in the second sequence of measurement results is now described.

The system prepares the qubits included in the first segmented quantum computing environment and the second segmented quantum computing environment by initializing a qubit included in the first segmented quantum computing environment (hereafter referred to as the first qubit) and a qubit included in the second segmented quantum computing environment (hereafter referred to as the second qubit) in a zero state. The system also initializes two qubits in the shared environment (hereafter referred to as the third qubit and fourth qubit) in a zero state. The system entangles the third qubit and the fourth qubit. For example, the system can apply a Hadamard gate to the third qubit (or alternatively to the fourth qubit) and a CNOT operation to the third qubit and the fourth qubit, where the third qubit (or, if the Hadamard gate is applied to the fourth qubit, the fourth qubit) acts as a control for the CNOT operation. The system applies a first swap quantum gate to the first qubit and the third qubit, and applies a second swap quantum gate to the second qubit and the fourth qubit. This preparation/initialization step is illustrated in FIG. 3.

The system then applies the n-th quantum computation in the first sequence of quantum computations to the first qubit and a measurement operation to the first qubit to obtain an n-th measurement result in the first sequence of measurement results. The system also applies, approximately in parallel, the n-th quantum computation in the second sequence of quantum computations to the second qubit and a measurement operation to the second qubit to obtain an n-th measurement result in the second sequence of measurement results.

The system generates i) a first encryption key using the first sequence of measurement results, ii) a second encryption key using the second sequence of measurement results, and iii) an encrypted authorization token using the second encryption key (step 608). In some implementations the system can use respective sequences of measurement results as keys, e.g., set the first encryption key as equal to the first sequence of measurement results and set the second encryption key as equal to the second sequence of measurement results. In other implementations the system may include one or more key generators (in shared space or in the segmented quantum computing environments) that use the sequences of measurement results as a seed input. In other implementations the system can use the measured qubits as an XOR Cipher against the original hexadecimal input. These implementations mitigate the reduction of a bit input, e.g., a 160 bit input (20 hexadecimal characters), to a lower number of bits, e.g., 20 bits.

To generate the authentication token, the system can apply known techniques, e.g., Kerneros. The Username, UserID, Domain and Lifetime of the authentication token would be available to view by the second party access target—but the Ticket Granting Server Session Key (TGS Session Key) would be encrypted by the symmetric quantum-generated key. Without this Session Key, the second party is unable to grant Access to the first party, despite the first party having a valid authentication token/ticket. The advantage is that a hacker who steals the authentication token still cannot use it with for unauthorized actions. Only the first party (assuming they have also generated the same correct symmetric key) can decrypt it—which they could then use to gain access to the second party.

The system sends i) the first encryption key to the first party, and ii) the encrypted authorization token to the second party (step 610). In some implementations the system may destroy the first encryption key after sending the first encryption key to the first party. In addition, the system may destroy the first segmented quantum computing environment after destroying the first encryption key. Similarly, in some implementations the system may destroy the second encryption key after generating the encrypted authorization token. In addition, the system may destroy the second segmented quantum computing environment after sending the encrypted authorization token to the second party.

In response to receiving the first encryption key, the first party can provide the first encryption key to the second party. The second party can determine whether or not to allow the first party to access the requested data by determining whether the first encryption key can successfully decrypt the encrypted authorization token, as described below with reference to FIGS. 8-10.

Figure 7:
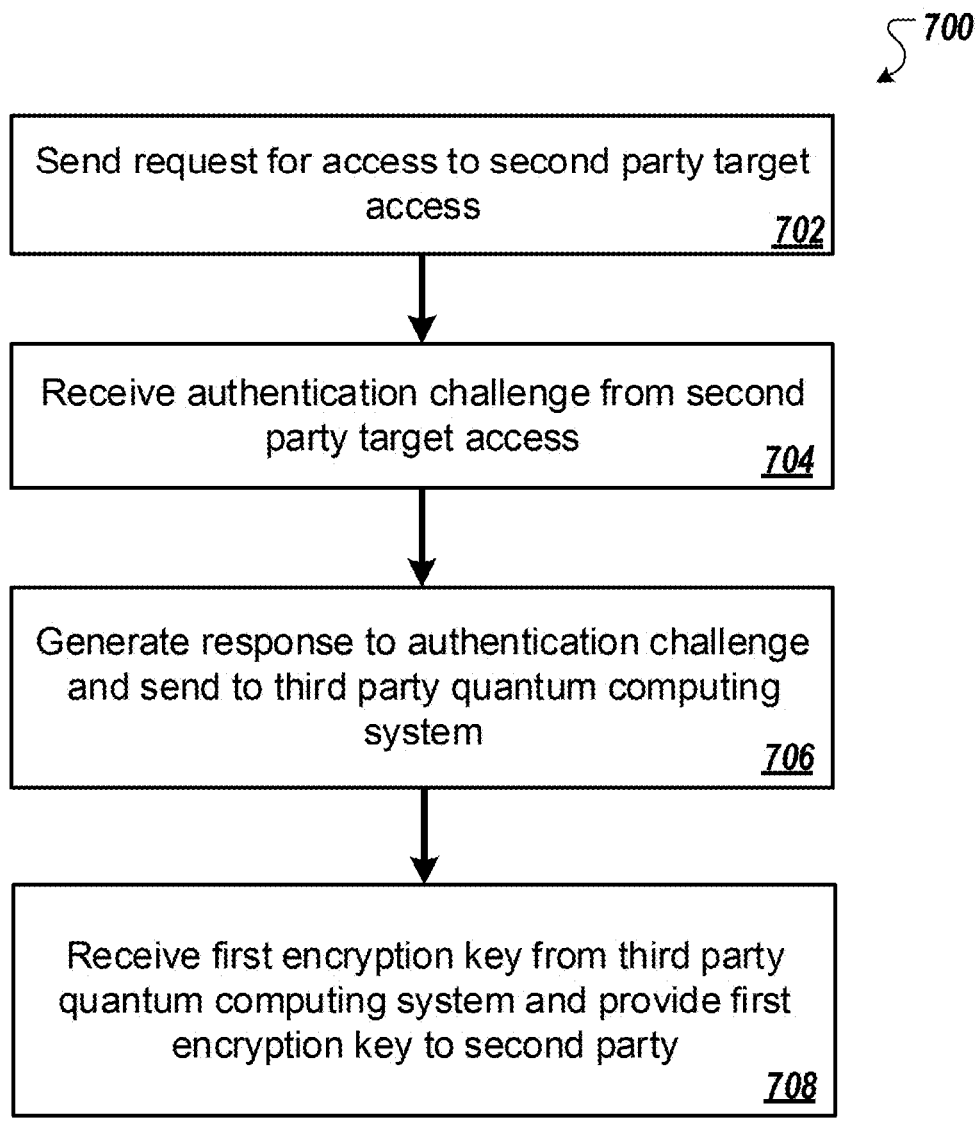
FIG. 7 is a flow diagram of an example process for secure data access.

FIG. 7 is a flowchart of an example process 700 for secure data access. The process 700 will be described as being performed by a first party accessor system. For example, a first party accessor that includes one or more classical computing devices located in one or more locations, appropriately programmed in accordance with this specification, can perform the process 700.

The system sends a request to a second party access target to access the second party access target (step 702).

The system receives an authentication challenge from the second party access target (step 704). The authentication challenge can be an authentication challenge previously established between the first party accessor and the second party access target during an enrollment process.

The system generates a response to the received authentication challenge (step 706). The generated response includes a first plaintext data input. The system sends the first plaintext data input to a third party quantum computing environment. In response to receiving the first plaintext data input he third party quantum computing environment: applies a quantum computation translation operation to i) the first plaintext data input to generate a corresponding first sequence of quantum computations, and ii) a second plaintext data input received from the second party access target to generate a corresponding second sequence of quantum computations; implements i) the first sequence of quantum computations in a first segmented quantum computing environment to obtain a first sequence of measurement results, and ii) the second sequence of quantum computations in a second segmented quantum computing environment to obtain a second sequence of measurement results; and generates i) a first encryption key using the first sequence of measurement results, ii) a second encryption key using the second sequence of measurement results, and iii) an encrypted authorization token using the second encryption key.

The system receives the first encryption key from the third party quantum computing environment and provides the first encryption key to the second party (step 708). In response to the second party authorizing the request using the encrypted authorization token and the first encryption key, the system obtains access to the second party access target. In response to the second party denying the request using the encrypted authorization token and the first encryption key, receiving the requested data, the system receives data indicating denial of access to the second party access target.

Figure 8:
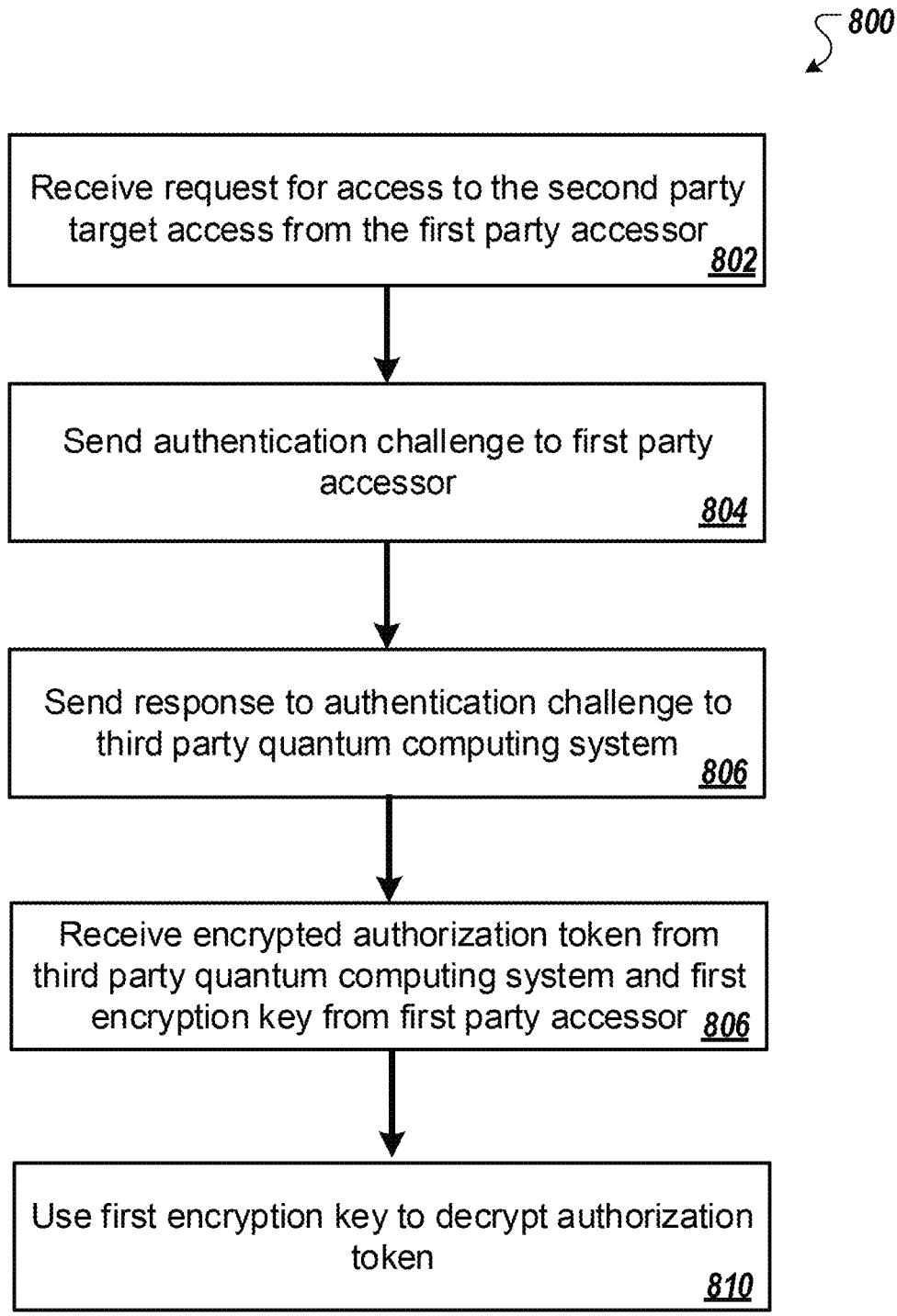
FIG. 8 is a flow diagram of an example process for providing secure access to a second party access target.

FIG. 8 is a flow diagram of an example process for providing secure access to a second party access target. The process 800 will be described as being performed by the second party access target system. For example, a second party access target system that includes one or more classical computing devices located in one or more locations, appropriately programmed in accordance with this specification, can perform the process 800.

The system receives, from a first party accessor, a request for access to the second party access target (step 802).

The system sends, to the first party accessor, an authentication challenge (step 804). The authentication challenge is an authentication challenge previously established between the first party accessor and the second party access target during an enrollment process.

The system sends, to a third party quantum computing system, an expected response to the authentication challenge (step 806). The response includes a second plaintext data input. In response to receiving the second plaintext data input, the third party quantum computing environment: applies a quantum computation translation operation to i) a first plaintext data input received from the first party accessor to generate a corresponding first sequence of quantum computations, and ii) the second plaintext data input to generate a corresponding second sequence of quantum computations; implements i) the first sequence of quantum computations in a first segmented quantum computing environment to obtain a first sequence of measurement results, and ii) the second sequence of quantum computations in a second segmented quantum computing environment to obtain a second sequence of measurement results; and generates i) a first encryption key using the first sequence of measurement results, ii) a second encryption key using the second sequence of measurement results, and iii) an encrypted authorization token using the second encryption key.

The system receives the encrypted authorization token from the third party and the first encryption key from the first party accessor (step 808).

The system uses the first encryption key to decrypt the received encrypted authorization token (step 810). The system determines whether the decryption is successful or unsuccessful. In response to determining that the decryption is successful, the system allows the first party accessor access. In response to determining that the decryption is unsuccessful, the system denies the first party access.

Figure 9:
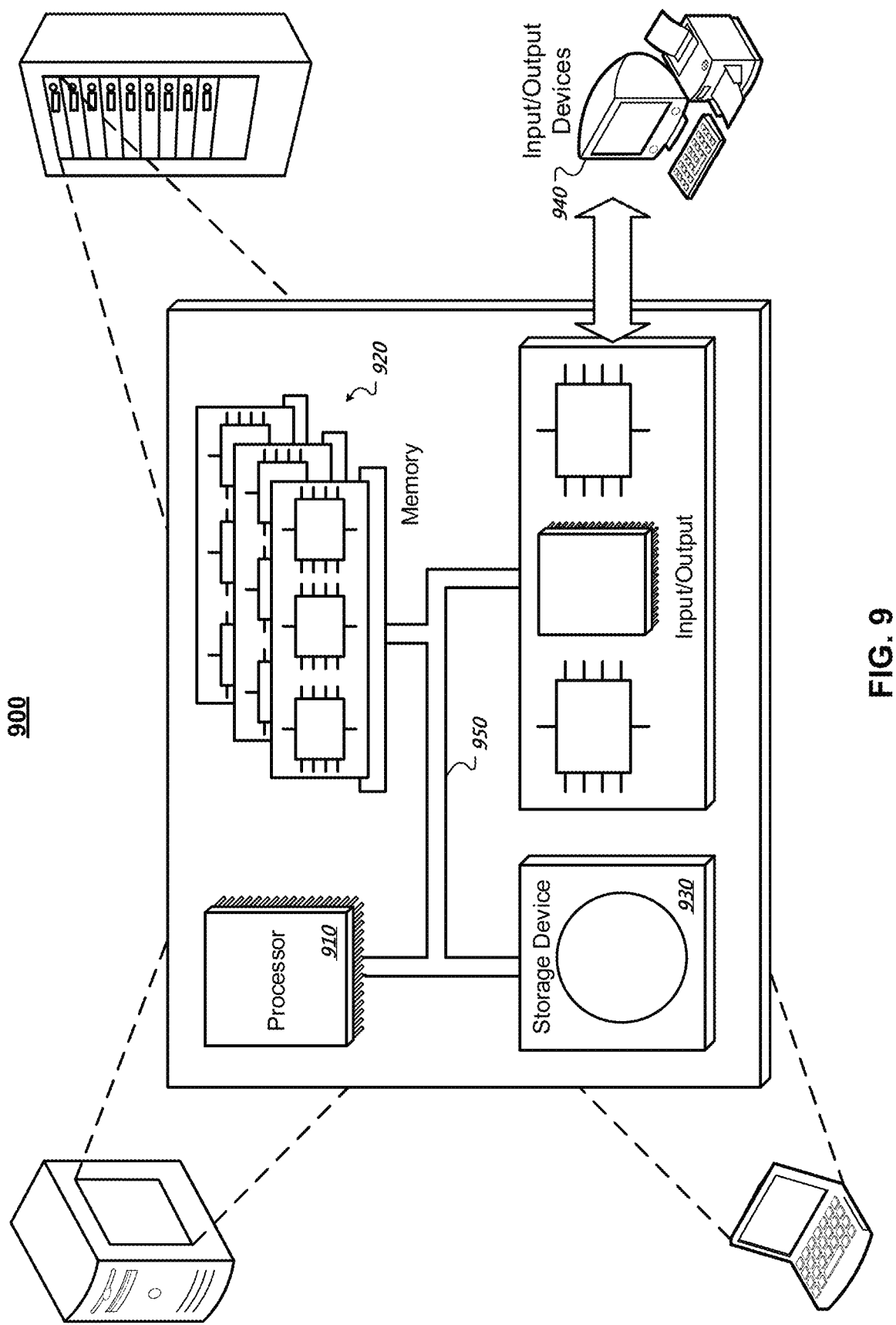
FIG. 9 depicts an example classical processor that may be used to carry out the classical computing methods described herein.

FIG. 9 illustrates a schematic diagram of an exemplary generic classical processing system 900. The system 900 can be used for the classical operations described in this specification according to some implementations. The system 900 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 900 includes a processor 910, a memory 920, a storage device 930, and an input/output device 940. Each of the components 910, 920, 930, and 920 are interconnected using a system bus 950. The processor 910 may be enabled for processing instructions for execution within the system 900. In one implementation, the processor 910 is a single-threaded processor. In another implementation, the processor 910 is a multi-threaded processor. The processor 910 may be enabled for processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 may be enabled for providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
sending, from a first party accessor and to a second party access target, a request for access to data stored by the second party access target;
receiving, by the first party accessor and from the second party access target, data specifying an authentication challenge;
generating, by the first party accessor, a response to the authentication challenge;
sending, from the first party accessor, the response to a third party quantum computing environment;
receiving, by the first party accessor and from the third party quantum computing environment, a first encryption key;
sending, by the first party accessor, the first encryption key to the second party access target, for the second party access target to determine whether the first encryption key decrypts an encrypted authorization token that was received by the second party access target from the third party quantum computing environment; and
based on the determination by the second party access target, either i) obtaining access to the data stored by the second party access target or ii) receiving data indicating denial of access to the data stored by the second party access target.

2. The method of claim 1, wherein the authentication challenge comprises an authentication challenge established between the first party accessor and the second party access target during an enrollment process.

3. The method of claim 1, wherein the response to the authentication challenge comprises a first plaintext data input and wherein in response to receiving the response to the authentication challenge, the quantum computing environment:
applies a quantum computation translation operation to i) the first plaintext data input to generate a corresponding first sequence of quantum computations, and ii) a second plaintext data input received from the second party access target to generate a corresponding second sequence of quantum computations;
implements i) the first sequence of quantum computations in a first segmented quantum computing environment to obtain a first sequence of measurement results, and ii) the second sequence of quantum computations in a second segmented quantum computing environment to obtain a second sequence of measurement results; and
generates i) the first encryption key using the first sequence of measurement results, ii) a second encryption key using the second sequence of measurement results, and iii) an encrypted authorization token using the second encryption key.

4. The method of claim 3, wherein to apply a quantum computation translation operation to i) the first plaintext data input to generate a corresponding first sequence of quantum computations, and ii) the second plaintext data input to generate a corresponding second sequence of quantum computations, the quantum computing environment independently:
applies the quantum computation translation operation to the first plaintext data input using a first classical processor in the first segmented quantum computing environment; and
applies the quantum computation translation operation to the second plaintext data input using a second classical processor in the second segmented quantum computing environment.

5. The method of claim 3, wherein
to implement the first sequence of quantum computations in a first segmented quantum computing environment to obtain a first sequence of measurement results, the quantum computing environment, for each quantum computation in the first sequence of quantum computations:
implements the quantum computation on a first qubit included in the first segmented quantum computing environment;
measures the first qubit in the first segmented quantum computing environment; and
provides a measurement result to classical hardware included in the first segmented quantum computing environment; and
to implement the second sequence of quantum computations in a second segmented quantum computing environment to obtain a second sequence of measurement results, the quantum computing environment, for each quantum computation in the second sequence of quantum computations:
implements the quantum computation on a second qubit included in the second segmented quantum computing environment;
measures the second qubit in the second segmented quantum computing environment; and
provides a measurement result to classical hardware included in the second segmented quantum computing environment.

6. The method of claim 5, wherein the first segmented quantum computing environment comprises a first ephemeral segmented quantum computing environment and the second segmented quantum computing environment comprises a second ephemeral segmented quantum computing environment.

7. The method of claim 3, wherein the quantum computation translation operation comprises an operation that maps each character in a plaintext data input to a respective quantum computation.

8. The method of claim 1, wherein sending the response to the third party quantum computing environment comprises sending the response via an Out-of-Band authenticator device.

9. A computer-implemented method comprising:
receiving, by a second party access target and from a first party accessor, a request for access to data stored by the second party access target;
sending, by the second party access target and to the first party accessor, data specifying an authentication challenge;
sending, by the second party access target and to a third party quantum computing system, an expected response to the authentication challenge;
receiving, by the second party access target, i) an encrypted authorization token from the third party quantum computing system and ii) a first encryption key from the first party accessor that the first party accessor previously received from the third party quantum computing system;
decrypting, by the second party access target and using the first encryption key, the encrypted authorization token;

determining, by the second party access target, whether decryption is successful or unsuccessful; and in response to determining that the decryption is successful, allowing, by the second party access target, the first party accessor access to the data; or in response to determining that the decryption is unsuccessful, denying, by the second party access target, the first party accessor access to the data.

10. The method of claim 9, wherein the authentication challenge comprises an authentication challenge established between the first party accessor and the second party access target during an enrollment process.

11. The method of claim 9, wherein the expected response to the authentication challenge comprises a second plaintext data input and in response to receiving the second plaintext data input, the third party quantum computing environment:

applies a quantum computation translation operation to i) a first plaintext data input received from the first party accessor to generate a corresponding first sequence of quantum computations, and ii) the second plaintext data input to generate a corresponding second sequence of quantum computations;

implements i) the first sequence of quantum computations in a first segmented quantum computing environment to obtain a first sequence of measurement results, and ii) the second sequence of quantum computations in a second segmented quantum computing environment to obtain a second sequence of measurement results; and generates i) the first encryption key using the first sequence of measurement results, ii) a second encryption key using the second sequence of measurement results, and iii) the encrypted authorization token using the second encryption key.

12. The method of claim 11, wherein to apply a quantum computation translation operation to i) the first plaintext data input to generate a corresponding first sequence of quantum computations, and ii) the second plaintext data input to generate a corresponding second sequence of quantum computations, the quantum computing environment independently:

applies the quantum computation translation operation to the first plaintext data input using a first classical processor in the first segmented quantum computing environment; and applies the quantum computation translation operation to the second plaintext data input using a second classical processor in the second segmented quantum computing environment.

13. The method of claim 11, wherein to implement the first sequence of quantum computations in a first segmented quantum computing environment to obtain a first sequence of measurement results, the quantum computing environment, for each quantum computation in the first sequence of quantum computations:

implements the quantum computation on a first qubit included in the first segmented quantum computing environment;

measures the first qubit in the first segmented quantum computing environment; and provides a measurement result to classical hardware included in the first segmented quantum computing environment; and to implement the second sequence of quantum computations in a second segmented quantum computing environment to obtain a second sequence of measurement results, the quantum computing environment, for each quantum computation in the second sequence of quantum computations:

implements the quantum computation on a second qubit included in the second segmented quantum computing environment;

measures the second qubit in the second segmented quantum computing environment; and provides a measurement result to classical hardware included in the second segmented quantum computing environment.

14. The method of claim 13, wherein the first segmented quantum computing environment comprises a first ephemeral segmented quantum computing environment and the second segmented quantum computing environment comprises a second ephemeral segmented quantum computing environment.

15. The method of claim 11, wherein the quantum computation translation operation comprises an operation that maps each character in a plaintext data input to a respective quantum computation.

16. The method of claim 9, wherein denying the first party accessor access to the data comprises sending, to the first party accessor, data indicating denial of access to the data stored by the second party access target.

17. The method of claim 9, further comprising sending, from the second party access target and to the third party quantum computing environment, an indication that the first party accessor has requested access to data stored by the second part and a request for creation of a first ephemeral segmented quantum computing environment and a second ephemeral segmented quantum computing environment.

18. The method of claim 9, further comprising receiving, by the second party access target and from the third party quantum computing environment, an indication that the third party quantum computing environment has received a response to the authentication challenge from the first party accessor.

19. A system comprising:

a first party accessor comprising one or more classical processors; and a third party quantum computing environment comprising quantum computing hardware;

wherein the system is configured to perform operations comprising:

sending, from the first party accessor and to a second party access target, a request for access to data stored by the second party access target;

receiving, by the first party accessor and from the second party access target, data specifying an authentication challenge;

generating, by the first party accessor, a response to the authentication challenge;

sending, from the first party accessor, the response to the third party quantum computing environment;

receiving, by the first party accessor and from the third party quantum computing environment, a first encryption key;

sending, by the first party accessor and to the second party access target, the first encryption key, for the second party access target to determine whether the first encryption key decrypts an encrypted authorization token that was received by the second party access target from the third party quantum computing environment; and based on the determination by the second party access target, obtaining access to the data stored by the second party access target or receiving data indicating denial of access to the data stored by the second party access target.

20. A system comprising:
a second party access target comprising one or more classical processors; and
a third party quantum computing environment comprising quantum computing hardware;
wherein the system is configured to perform operations comprising:
  receiving, by the second party access target and from a first party accessor, a request for access to data stored by the second party access target;
  sending, by the second party access target and to the first party accessor, data specifying an authentication challenge;
  sending, by the second party access target and to the third party quantum computing system, an expected response to the authentication challenge;
  receiving, by the second party access target, i) an encrypted authorization token from the third party quantum computing system and ii) a first encryption key from the first party accessor that the first party accessor previously received from the third party quantum computing system;
  decrypting, by the second party access target and using the first encryption key, the encrypted authorization token;
  determining, by the second party access target, whether decryption is successful or unsuccessful; and
  in response to determining that the decryption is successful, allowing, by the second party access target, the first party accessor access to the data; or
in response to determining that the decryption is unsuccessful, denying, by the second party access target, the first party accessor access to the data.

* * * * *